Oct. 15, 1968 J. TENO ET AL 3,406,300
HIGH TEMPERATURE ELECTRODE FOR MHD DEVICES
Filed Jan. 18, 1965
4 Sheets-Sheet 1

JOSEPH TENO
MARTIN E. NOVACK
INVENTOR

BY Alden D. Redfield
Melvin E. Frederick
ATTORNEYS

Oct. 15, 1968     J. TENO ET AL     3,406,300
HIGH TEMPERATURE ELECTRODE FOR MHD DEVICES
Filed Jan. 18, 1965     4 Sheets-Sheet 3

JOSEPH TENO
MARTIN E. NOVACK
INVENTOR

BY Alden D. Redfield
Melvin E. Frederick
ATTORNEYS

JOSEPH TENO
MARTIN E. NOVACK
INVENTOR

ATTORNEYS

United States Patent Office 3,406,300
Patented Oct. 15, 1968

3,406,300
HIGH TEMPERATURE ELECTRODE FOR MHD DEVICES
Joseph Teno, Medford, and Martin E. Novack, Brookline, Mass., assignors to Avco Corporation, Cincinnati, Ohio, a corporation of Delaware
Filed Jan. 18, 1965, Ser. No. 426,327
15 Claims. (Cl. 310—11)

ABSTRACT OF THE DISCLOSURE

An electrode construction for MHD devices including a material electrically conductive only at high temperatures covering a cooled metallic base member adapted to maintain a portion of the material covering it at a temperature at which it is not electrically conductive and thereby prevent the flow of current parallel to the direction of gas flow in the MHD device.

---

The present invention relates generally to the magnetohydrodynamic (hereinafter referred to as "MHD") devices employing a hot electrically conductive fluid or plasma, and more particularly to electrodes for use in such devices.

MHD generators produce electric power by movement of electrically conductive fluid or plasma relative to a magnetic field. The plasma employed is usually an electrically conductive gas from a high temperature, high pressure source. From the source, the plasma flows through the generator and by virtue of its movement relative to the magnetic field, induces an electromotive force between opposed electrodes within the generator. The gas comprising the plasma may exhaust to a sink which may simply be the atmosphere; or, in more sophisticated systems, the gas may exhaust to a recovery system including pumping means for returning the gas to the source. Conductivity of the gas may be produced thermally and/or by seeding with a substance that ionizes readily at the operating temperature of the generator. For seeding purposes, sodium, potassium, cesium or an alkali metal vapor may be used. Regardless of the gas used, or the manner of seeding, the resulting gases comprise a mixture of electrons, positive ions, and neutral atoms which, for convenience, is termed "plasma."

An MHD generator of the type described normally employs a stationary magnetic field and unidirectional gas flow. As a result, such a generator is inherently a source of direct current. If alternating current is desired, some form of auxiliary equipment is usually provided to invert the direct current to alternating current.

MHD pumps use the DC motor principle, i.e., a conductive fluid is considered to be a wire or conductor suspended in a magnetic field and has a current passed through it mutually perpendicular to the length of the conductor and the magnetic field. Under these conditions, a force is induced in the conductor which tends to move it in a direction which is mutually perpendicular to the current and magnetic flux. This force, when applied to a liquid conductor, propels the liquid conductor in the same manner as a conventional pump. Such pumps have become quite common in laboratory work and in connection with the movement of liquid sodium and liquid sodium-potassium in nuclear reactors. Electrodes for passing electric current through the liquid conductor within the magnetic field are located in what is generally referred to as the throat of the pump.

MHD accelerators are constructed and operate in substantially the same manner as MHD pumps, the difference being that whereas MHD pumps are generally used for pumping liquids, MHD accelerators are generally used for accelerating an electrically conductive gas.

For a more thorough discussion of MHD generators, reference is made to patent application Ser. No. 8,566 filed Feb. 15, 1960.

The present invention is an improvement over the electrode construction disclosed in patent application Serial No. 280,273 filed May 14, 1963, and entitled, "High Temperature Anisotropic Nonconsumable Electrode." Briefly, the electrode disclosed therein comprises a metallic end portion exposed to the electrically conductive gas and provided with at least one recess in its end surface which is filled with a heat resistant filler material electrically conductive at the operating temperature of the gas and an insulator at a temperature substantially less than the operating temperature of the gas. A portion of the extreme end of the metallic material remains exposed to the gas so that it bears the shear stresses due to gas friction.

In accordance with the present invention, there is provided an essentially nonconsumable electrode for use in an electrically conductive plasma at the temperature of products of combustion. A cooled metallic member functions as the base member of the electrode. The dimension of the metallic member in the direction of gas flow is made small compared to its dimension normal to the direction of gas flow and in the preferred embodiment the end of the member proximate the gas is grooved to provide a second end surface spaced further from the gas than a first end surface. Covering and in contact with both the first and second end surfaces is a material electrically conductive at the operating temperature of the gas and substantially electrically nonconductive at a temperature substantially less than that of the gas. Means which may include a refractory material nonconductive at the operating temperature of the gas interposed between and separating the material covering each member and/or thermally conductive means in thermal contact with each member and extending to a point adjacent the exposed surface of the material covering each member provide a high impedance zone between the material covering adjacent members and thereby prevent the flow of current between the aforementioned material covering adjacent members.

It is therefore a principal object of the present invention to provide essentially nonconsumable electrodes for MHD devices.

It is another object of the present invention to provide an electrode for operation in a high temperature atmosphere.

It is a further object of the present invention to provide electrodes for use in MHD devices which permit the conduction of electricity only in a direction normal to the direction of gas flow.

It is a still further object of the present invention to provide electrodes for MHD devices which function both as an electrical conductor and insulator.

A still further object of the present invention is the provision in MHD devices of electrodes having good endurance characteristics wherein the electrode material exposed to the gas can be replenished without the removal of the electrode from operation.

The novel features that are considered characteristic of the present invention are set forth in the appended claims; the invention itself, however, both as to its organization and method of operation, together with additional objects and advantages thereof, will best be understood from the following description when read in conjunction with the accompanying drawings, in which:

Figure 1:
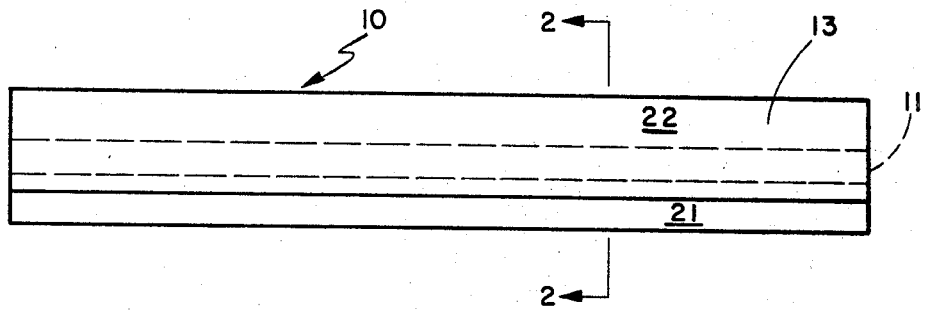
FIGURE 1 is a top view of a base member forming part of the present invention.
Figure 2:
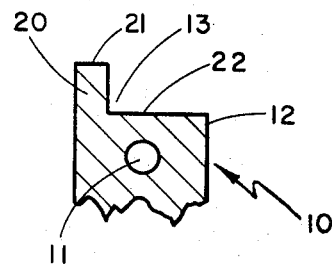
FIGURE 2 is a partial end view taken on line 2—2 of FIGURE 1.
Figure 3:
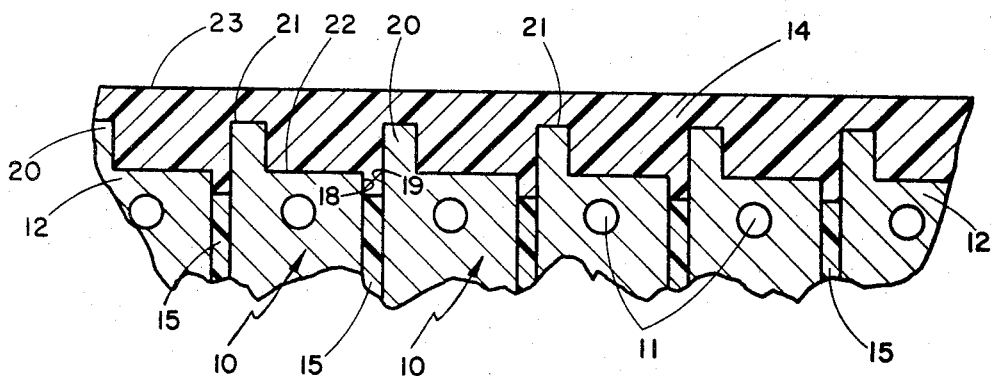
FIGURE 3 is a sectional end view of electrodes in accordance with the present invention.

Attention is now directed to FIGURES 1, 2, and 3 which illustrate an electrode constructed in accordance with the present invention. As best shown in FIGURES 1 and 2, the electrode may be comprised of a metallic base member 10, such as for example copper, provided with a passage 11 to receive a coolant, an end portion 12 provided with a groove or recess 13 extending over the length of the member. The groove or recess 13 is filled with a semiconductor material 14 (shown in FIGURE 3) more fully described below.

When mounted in an MHD device, the electrodes must of course be electrically insulated one from another to prevent short circuiting. Pressure-bearing insulating material 15, such as Teflon, cork, rubber, or the like, may be provided at the low temperature regions and at the bottom surface (not shown) remote from the gas and a refractory material (or the semiconductor material 14 as shown in FIGURE 3), such as for example alumina, magnesia, silica, and zircon, provided between the upper portions of the side surfaces 18 and 19 of adjacent members. A suitable refractory material should be electrically nonconducting at the average temperature of the duct walls, it should not form low temperature melting mixtures or chemically react with the materials used to fabricate the duct walls, it should be able to withstand thermal stress and shocks at temperatures characteristic to MHD devices, and it should be chemically inert with combustion products.

Present day electrically conductive gases or plasmas used in MHD devices are either noble gases heated to a temperature of at least 2000° F. or more, or products of combustion at a temperature of about 5000° F. Accordingly, an electrode in accordance with the present invention intended for use in MHD devices in any event must be exposed to temperatures in excess of 2000° F. that may vary over a considerable range and most likely exposed to a corrosive and/or oxidizing plasma. Under these condiitons, it has been found that a semiconductor material is most suitable. The semiconductor material may be doped with an electrically emissive material for emitter electrodes.

While the present invention is not limited to the use of a semiconductor or refractory material, it will be so described for convenience and by way of example. Thus, whether of a refractory nature or not, the material deposited in grooves 13 should not be oxidizable when exposed to the electrically conductive gas, and it should have a low coefficient of expansion to prevent or at least minimize cracking, spalling and the like.

The electrical conductivity of the semiconductor material forming part of an electrode of the type here concerned is a function of temperature. Thus, for a given electrically conductive gas or plasma and electrode design, the temperature of the exposed surface of the semiconductor material depends on the gas temperature gradient in the boundary layer and since the conductivity of gases is strongly dependent on temperature, the Joule dissipation in the boundary layer is dependent on the temperature of the boundary layer. Further, for many applications, the electrically conductive gas used in MHD devices reacts with and, therefore, consumes electrode refractory materials such as carbon, tungsten, molybdenum, columbium, and the like.

In accordance with the present invention, semiconductor material that has been found satisfactory is described in an article entitled, "Properties and High Temperature Applications of Zirconium Oxide," in Ceramic Age, June 1962. This material is zirconium oxide with about 6.4 mole percent calcium oxide. While such a material serves equally as well in an inert atmosphere as in an oxidizing atmosphere, other materials, such as for example zirconium diboride or zirconium nitride, without additives, or perhaps refractory ceramics doped with either barium oxide or calcium oxide and the like, may be used in an inert or nonoxiding atmosphere.

By way of example, for thermally emissive electrodes, a suitable level of thermal emission is of at least the order of ten amperes per square centimeter required in MHD generators and one hundred amperes per square centimeter required in MHD accelerators. As noted previously, zirconium oxide doped with 6.4 mole percent calcium oxide will provide satisfactory electrical characteristics.

Cooling of the metallic portion of the electrode 10 is required for continuous operation of long duration and particularly when the electrically conductive gas is at about 5000° F. as is the case for a suitable electrically conductive gas comprised of products of combustion. Typically, with cooling, the metallic portion of the electrode may be maintained at a temperature of only 500° F. The metallic portion 10 of the electrode may be of any suitable metal, such as for example copper, nickel or steel. As compared to an electrode having a metallic portion composed of copper or the like, nickel or steel can be used where it is desired to employ a coolant which operates at high temperature and high pressure, such as water, at 400° F. and 1,000 p.s.i.

For the minimum effect of friction, the electrode should be oriented such that elongated grooves or recesses are normal to the direction of gas flow. The semiconductor material may be conveniently deposited in the grooves or recesses by troweling, firing, or by the plasma spraying technique. However, it is to be understood that the present invention is not limited to the type of grooves shown and described as many types of cavities may be used to suitably retain the semiconductor material. Thus, if there is no Hall potential or it is small, the electrode grooves may be disposed parallel to the direction of gas flow.

A suitable depth and width of the recesses are essentially determined by the thermal characteristics of the semiconductor material. The depth and width of the recesses are advantageouly selected in a manner to provide the desired surface temperature of the semiconductor material in the recess which results in maximum electrical conductivity and, hence, minimum electrode drop for the particular material that is selected. The optimum temperature will of course be determined by the composition of the material that is selected. By way of example, a temperature of about 3640° F. at a portion of the exposed surface of zirconia has been found to be satisfactory.

Attention is now particularly directed to the relatively narrow projection 20 formed by the provision of the two-sided groove 13. It will be seen from an inspection of FIGURE 3 that the end portion 12 of each member proximate the gas is comprised of a first end surface 21 and a second larger end surface 22 spaced further from the gas or exposed surface 23 of the semiconductor material than the first mentioned first end surface 21. The dimension of the end portions 12 of each member proximate the gas is preferably small in the direction of gas flow (from left to right for example in FIGURE 3) compared to the dimension of the members normal to the direction of gas flow. Accordingly, the thickness of the semiconductor material covering each projection 20 (or surface 21) is less than the thickness of the semiconductor material covering the balance of each member (or surface 22). Because of the high thermal conductivity of the metallic member including projection 20 as compared to that of the semiconductor material, the temperature at the surface 23 of the semiconductor material over the second or more remote surfaces 22 will approach that of the gas, whereas the temperature of the semiconductor material over the projections or surfaces 21 will be substantially less. As will now be obvious, the thickness of the semiconductor material over the projections 20 may be easily selected to provide a temperature throughout this region that is less than that at which the semiconductor material is electrically conductive, thereby providing a high impedance zone between the semiconductor material covering adjacent members. The temperature of the exposed surface 23 of the semiconductor material over the second surface 22 approaches that of the gas and, hence, is electrically conductive.

The depth or thickness of the semiconductor material over the second surface must be optimized since shallow grooves cause the semiconductor material to run too cold and, thereby, lead to poor performance. Alternately, while very deep grooves increase the electrical conductivity of the semiconductor material, such grooves causes the semiconductor material to run too hot and, thereby, lead to erosion of the electrode and increased pressure drop. In actual tests, groove 0.10" deep (normal to the direction of gas flow) and 0.20" wide (in the direction of gas flow) were found satisfactory for a heat flux of $0.75 \times 10^6$ B.t.u./hr./ft.$^2$. A good rule of thumb for selecting a groove width is that the groove width should be between one to two times the groove depth. Theory is available to select satisfactory widths for the projections 20 as well as groove depths for given heat transfer rates. In practice, it is desirable to make the width of the base members 10 as small as practically possible so that the maximum number of electrodes can be used. In the aforementioned actual tests, an electrode drop of about 18 volts was measured when semiconductor material comprising zirconia in a groove 0.10" x 0.20" ranged in temperature between 3320° F. and 3410° F., whereas at 3640° F. to 3720° F. the electrode drop was about 12 volts.

As will now be evident, the semiconductor material as shown in FIGURE 3 functions to provide a stable, smooth and continuous surface wherein alternate spaced portions function as electrically conductive electrodes to permit the conduction of current in a direction normal to the direction of gas flow and the portions of the same material intermediate the alternate spaced portions functions as electrically nonconductive insulators and prevents the conduction of current in a direction parallel to the direction of gas flow, i.e., the material intermediate the alternate electrically conductive portions provides high impedance zones which at least substantially prevent the flow of current parallel to the direction of gas flow between the semiconductor material covering adjacent members.

Figure 4:
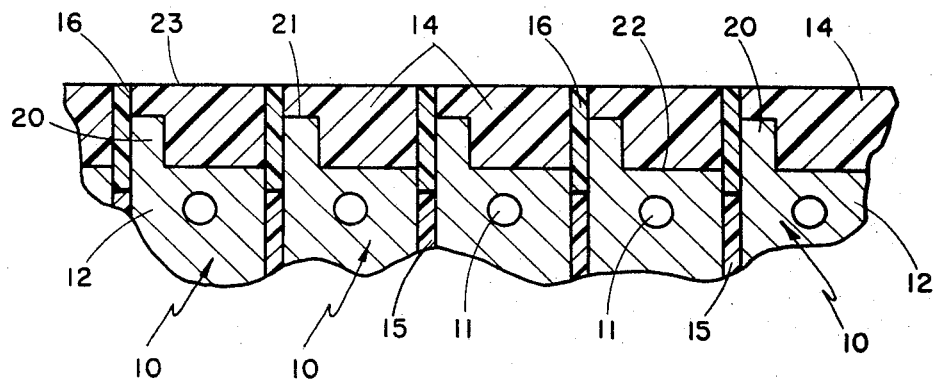
FIGURE 4 is a sectional end view of a modification.

Directing attention to FIGURE 4, it will be noted that the arrangement shown therein is identical to that shown in FIGURE 3 with the exception that refractory material 16 electrically nonconductive at the operating temperature of the gas, such as for example alumina, is disposed between the upper portions of adjacent members 10 and extends to the exposed surface 23 of the semiconductor material 14. While the extension of the electrically nonconductive refractory material 16 is not essential for the prevention of current flow in a direction parallel to the direction of gas flow (the flow of Hall currents, for example), it does increase the impedance between the electrically conductive zones. However, because of the structural rigidity of such material, at substantially all temperatures, it bears the shear stresses due to gas friction and, thereby, reduces erosion or possible flowing of the semiconductor material. The insulating material 15 provides a gas seal.

Figure 5:
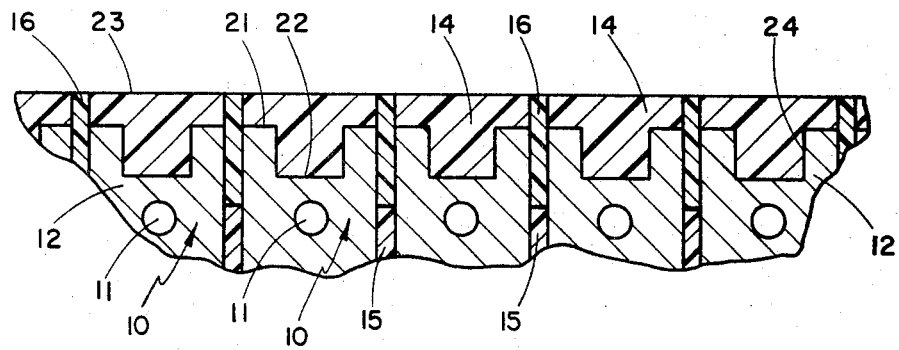
FIGURE 5 is a sectional end view of a further modification.

FIGURE 5 shows a further modification of the embodiment shown in FIGURE 3 wherein the groove or recess 13 of FIGURE 2 is in the form of a conventional three-sided groove 24. Although rectangular grooves are shown and described by way of example, it should be understood that the invention is not so limited and other groove configurations may be used.

Figure 6:
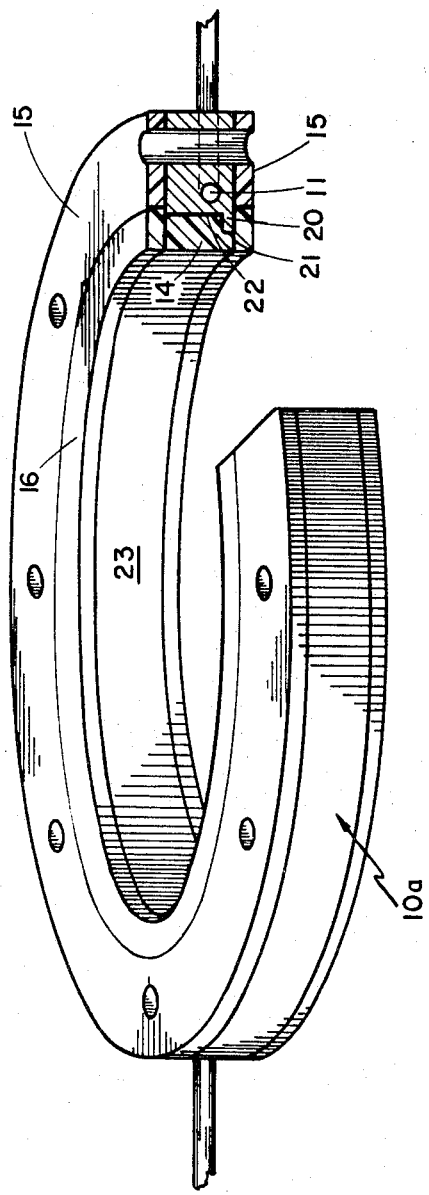
FIGURE 6 is a perspective view of an annular plate incorporating the present invention.

FIGURE 6 shows the present invention forming in accordance with FIGURE 4 part of an annular metallic plate 10a. A plurality of such plates may be used, for example, to form part of a duct of a Hall current MHD generator or accelerator. Alternately, the plates may be of a different configuration, such as generally rectangular in shape, and form part of a duct of a diagonal-type MHD generator wherein the electrodes are not short circuited.

In a diagonal-type MHD generator or accelerator, the plates are generally disposed at a predetermined angle other than 90° to the direction of gas flow such that they follow or at least approximately follow an equipotential surface. In Hall current generators, the plane of the equipotential surfaces are normal to the direction of gas flow. For a more thorough discussion of the construction of MHD ducts utilizing annular plates, reference is made to patent application Ser. No. 411,413 filed Nov. 16, 1964.

Figure 7:
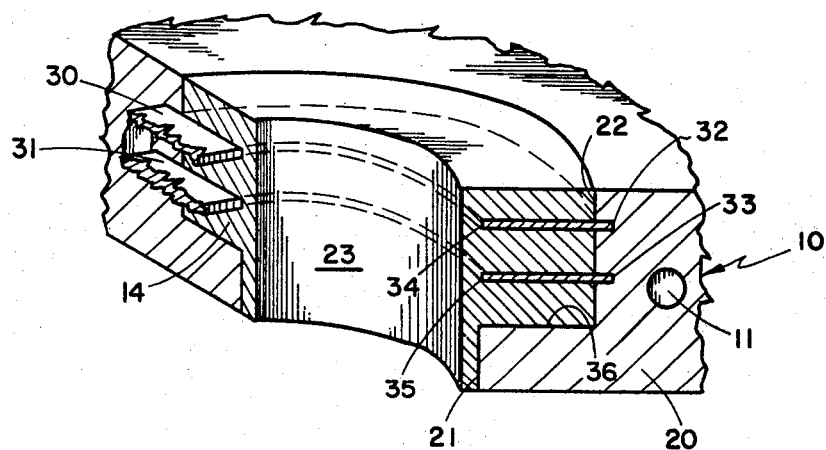
FIGURE 7 is a fragmentary view in cross section of an electrode incorporating conductors.
Figure 8:
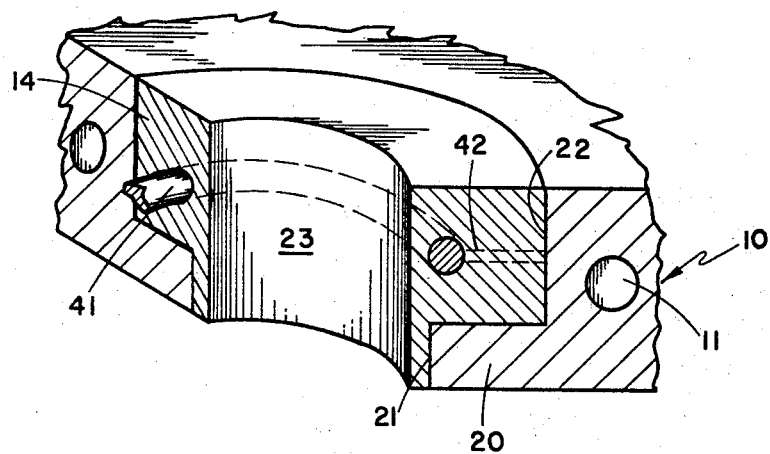
FIGURE 8 is a fragmentary view in cross section of a further modification.

FIGURE 7 and FIGURE 8, which illustrate further modifications of the present invention, are fragmentary and sectional views of a modification of the arrangement shown in FIGURE 6. Directing attention now to FIGURE 7, it will be noted that continuous ring-shaped conductors 30 and 31 imbedded in the semiconductor material 14 are in electrical contact with member 10 at their outer periphery 32 and 33, whereas their inner periphery 34 and 35 are adjacent to surface 23. The conductors 30 and 31 are preferably comprised of a high temperature refractory metal, such as zirconium-diboride ($ZrB_2$), which has a resistivity of about $50 \times 10^{-6}$ ohms/cm. and a melting point of about 5400° F. Whereas two conductors are shown in FIGURE 7, it is to be understood that only one or greater number may be used. The conductors 30 and 31, depending for example on the maximum temperature which they must withstand and the conditions under which the generator is to be operated, may have their inner periphery exposed to the gas or be completely imbedded in the semiconductor material. If material such as zirconium-diboride is not used, the conductors should be composed of a high temperature metal, such as for example platinum, Inconel, Hastelloy-X, or other high temperature stainless steel, but attention must be paid to conduction of heat through the metal and the thermal stresses across the metal.

It is significant to note that the inner periphery of conductors 30 and 31 (as well as conductor 41 of FIGURE 8) terminate in or at least adjacent the electrically conductive portion of the semiconductor material 14 and thereby provide a low resistance path for electrical current (as compared to that of the semiconductive material adjacent member 10). However, it is important to note that the semiconductor material 14 when in contact over a substantial area with a low temperature surface, such as that of member 10, is a poor conductor at this point. Thus, if current must flow through such a high resistance barrier in an electrode, a large voltage or electrode drop will be produced. Accordingly, the conductors 30 and 31, imbedded in the semiconductor material 14, must be arranged and adapted in conventional manner such that while they make contact with the hot or electrically conductive portion of the material 14 and thereby provide a low resistance path for current flow from or to this region, they do not provide a large or significant thermal path from this region to any cool member, or distort or reduce the temperature of the electrically conductive portion of material 14. The above requirement may be simply achieved, for example, by providing the conductors with a thin cross section and/or providing only sufficient electrical contact at spaced points between the conductors and member 10, for example, to carry the design current of the electrode but not conduct a significant amount of heat from material 14 through conductors 31 and 32 to member 10.

Broadly speaking, the basic requirements for the selection and configuration of a conductor imbedded in material 14 in accordance with the present invention are that the conductor material comprising the conductor be a better conductor than the electrically conductive portion of the semiconductor material, the conductor material must be capable of withstanding the MHD operating conditions within the duct, the conductor material must not react with the semiconductor material, the conductor material must be able to withstand substantial thermal stresses, or else be designed in a manner that eliminates thermal stresses, and a configuration must be selected which will carry the electrode current totally by itself or to a base member while not distorting to a substantial degree the thermal patterns existing in the semiconductor material and particularly, the thermal patterns in the electrically conductive portions of the semiconductor material.

The arrangement shown in FIGURE 7 is preferred for a diagonal-type generator where current flows across the duct between oppositely disposed electrodes and thence to a load. While a cylindrical duct has been suggested, it is to be understood that the duct may have a rectangular or other configuration. Further, the arrangement shown in FIGURE 7 may also be used in Hall current generators.

For a single conductor arrangement wherein a single conductor is imbedded in the semiconductor material, a preferred location is along a constant temperature line, such as adjacent the side wall 36 where in this case the thermal gradients tend to be more or less normal to the direction of gas flow, i.e., surface 23.

In fabricating an electrode, semiconductor material such as zirconia fired to 3000° F. may comprise the majority of the semiconductor material 14. After attaching a conductor to the base member, such as for example conductor 31, in FIGURE 7, the conductor and surfaces 21, 36, and 22 may be covered with semiconductor material in paste form and the fired semiconductor material machined to provide a mating fit. Thereafter, the entire structure may be cured at a suitable temperature such as 600° F. to bond the fired semiconductor material to the base member.

The arrangement shown in FIGURE 8 comprises a wire-like conductor 41 imbedded in the semiconductor material 14. In this case, it should be noted that the conductor 41 is not in electrical contact with member 10. This arrangement is most suitable for use in Hall current generators wherein transverse current flow across the duct is generally short circuited.

It will now be apparent that the configuration of conductors imbedded in the semiconductor material may have a large number of configurations as, for example, wire-shaped, ring-shaped, T-shaped, L-shaped, U-shaped, slab-shaped, and segmented. Further, the conductors may be in continuous contact with, discontinuous contact with, or electrically insulated from a cool base member. For example, wires or the like (designated by the broken line 42) having a small cross section to limit heat conduction may be utilized for providing electrical contact between an imbedded conductor and a cool base member which are otherwise effectively electrically and thermally insulated from each other. Where sufficient heat transfer to the semiconductor material is present the conductors may be terminated below the surface 23 and adjacent the electrically conductive portion of the semiconductor material to provide the desired electrode drop. However, under low heat transfer conditions and little or no reaction between the conductors and the gas, the inner periphery of the conductors may be exposed to the gas. In this case, the conductor does not act as the electrode since current flow is still between the material 14 and the conductor. As previously noted, these conductors may be continuous and closed on themselves where it is desired to provide a short circuit or the conductors may be discontinuous where it is desired to connect a load across the generator.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

We claim:

1. In an MHD device having a duct for conveying an electrically conductive gas at a temperature of at least about 2000° F. through a magnetic field, electrode means defining at least one wall of said duct comprising:
   (a) metallic members forming part of said one wall of said duct and disposed normal to the direction of flow of said gas, said members having an end surface proximate said gas, the dimension of said end surfaces in the direction of gas flow being small compared to the dimension of said end surfaces normal to said direction of gas flow, said members having a passage for receiving a coolant;
   (b) a material electrically conductive at the operating temperature of said gas and substantially electrically nonconductive at a temperature substantially less than that of said gas, said material being in contact with and covering each said end surface;
   (c) means for electrically insulating adjacent members one from another; and
   (d) means for providing a high impedance zone between said material covering adjacent members comprising thermally conductive means in thermal contact with respectively each said end surface and extending to a point adjacent the exposed surface of said material whereby the temperature of said material covering said thermally conductive means is maintained at a value sufficient to render it substantially electrically nonconductive and substantially prevent the flow of current between said material covering adjacent members.

2. In an MHD device having a duct for conveying an electrically conductive gas at a temperature of at least about 2000° F. through a magnetic field, electrode means defining at least one wall of said duct comprising:
   (a) metallic members forming part of said one wall of said duct and disposed normal to the direction of flow of said gas, said members having an end surface proximate said gas, the dimension of said end surfaces in the direction of gas flow being small compared to the dimension of said end surfaces normal to said direction of gas flow, said members having a passage for receiving a coolant;
   (b) a material electrically conductive at the operating temperature of said gas and substantially electrically nonconductive at a temperature substantially less than that of said gas, said material being in contact with and covering each said end surface;
   (c) means for electrically insulating adjacent members one from another; and
   (d) thermally conductive means in thermal contact with respectively each said member and extending to a point adjacent the exposed surface of said material covering each said member for maintaining the portion of said material over said thermally conductive means at a temperature at which said portion is substantially electrically nonconductive.

3. In an MHD device having a duct for conveying an electrically conductive gas at a temperature of at least about 2000° F. through a magnetic field, electrode means defining at least one wall of said duct comprising:
   (a) metallic members forming part of said one wall of said duct and disposed normal to the direction of flow of said gas, said members having an end surface proximate said gas, the dimension of said end surfaces in the direction of gas flow being small compared to the dimension of said end surfaces normal to said direction of gas flow, said members having a passage for receiving a coolant;

(b) a semiconductor material electrically conductive at the operating temperature of said gas and substantially electrically nonconductive at a temperature substantially less than that of said gas, said semiconductor material being in contact with and covering each said end surface;

(c) means for electrically insulating adjacent members one from another; and (d) thermally conductive means in thermal contact with said end surface and extending to a point adjacent the exposed surface of said material covering each said member for maintaining the portion of said material over said thermally conductive means at a temperature at which said portion is substantially electrically nonconductive, the dimensions of said semiconductor material covering the balance of said end surfaces limiting heat transfer therethrough to maintain at least a portion of said material covering the balance of said end surfaces at a temperature at which it is electrically conductive.

4. In an MHD device having a duct for conveying an electrically conductive gas at a temperature of at least about 2000° F. through a magnetic field, electrode means defining at least one wall of said duct comprising:

(a) metallic members forming part of said one wall of said duct and disposed normal to the direction of flow of said gas, said members having an end portion proximate said gas, said end portion having a first end surface and a second end surface spaced further from said gas than said first end surface, the dimension of said end portions in the direction of gas flow being small compared to the dimension of said end portions normal to said direction of gas flow;

(b) means for cooling each said member;

(c) means for electrically insulating adjacent members one from another; and (d) a semiconductor material electrically conductive at the operating temperature of said gas and substantially electrically nonconductive at a temperature substantially less than that of said gas, said material being in contact with and covering each said end surface, said material over said first end surface having first dimensions whereby the heat transfer through said material to said first surface maintains said material over said first surface at a temperature at which it is substantially electrically nonconductive, said material over said second end surface having second dimensions whereby the heat transfer through said material to said second end surface maintains at least a part of said material over said second end surface at a temperature at which it is electrically conductive.

5. In an MHD device having a duct for conveying an electrically conductive gas at a temperature of at least about 2000° F. through a magnetic field, electrode means defining at least one wall of said duct comprising:

(a) elongated metallic members forming part of said one wall of said duct and disposed normal to the direction of flow of said gas, said members having an end portion proximate said gas, said end portion having a first end surface and a second end surface spaced further from said gas than said first end surface, said first and second end surfaces being of substantially equal length, the dimension of said end portions in the direction of gas flow being small compared to the dimenion of said end portions normal to said direction of gas flow;

(b) means for cooling each said member;

(c) means for electrically insulating adjacent members one from another; and (d) a semiconductor material electrically conductive at the operating temperature of said gas and substantially electrically nonconductive at a temperature substantially less than that of said gas, said material being in contact with and covering each said end surface, said material over said first end surface having first dimensions whereby the heat transfer through said material to said first surface maintains said material over said first surface at a temperature at which it is substantially electrically nonconductive, said material over said second end surface having second dimensions whereby the heat transfer through said material to said second end surface maintains said material over said second end surface at a temperature at which it is electrically conductive, said material over said first end surface being effective to prevent current flow in the direction of gas flow between electrically conductive material covering adjacent members.

6. The combination as defined in claim 4 wherein said means for electrically insulating adjacent members one from another includes a refractory material nonconducting at the operating temperature of said gas interposed between and separating said semiconductor material covering each said member.

7. The combination as defined in claim 4 wherein said semiconductor material provides a continuous inner surface of said duct.

8. The combination as defined in claim 4 wherein each said member comprises part of a metal plate having a central opening and lying at least approximately along equipotential surfaces when said MHD device is operating at design conditions and said end portion defines at least part of the periphery of said central opening.

9. In an MHD device having a duct for conveying an electrically conductive gas at a temperature of at least about 2000° F. through a magnetic field, electrode means defining at least one wall of said duct comprising:

(a) metallic members forming part of said one wall of said duct and disposed normal to the direction of flow of said gas, said members having an end portion proximate said gas, said end portion having a first end surface and a second end surface spaced further from said gas than said first end surface, the dimension of said end portions in the direction of gas flow being small compared to the dimension of said end portions normal to said direction of gas flow;

(b) means for cooling each said member;

(c) means for electrically insulating adjacent members one from another;

(d) a semiconductor material electrically conductive at the operating temperature of said gas and substantially electrically nonconductive at a temperature substantially less than that of said gas, said material being in contact with and covering each said end surface, said material over said first end surface having first dimensions whereby the heat transfer through said material to said first surface maintains said material over said first surface at a temperature at which it is substantially electrically nonconductive, said material over said second end surface having second dimensions whereby the heat transfer through said material to said second end surface maintains at least a part of said material over said second end surface at a temperature at which it is electrically conductive; and (e) means having an electrical conductivity greater than that of said electrically conductive portion of said semiconductor material at least partially imbedded in said semiconductor material over each said second surface, a portion of said imbedded means being in electrical contact with said electrically conductive portions of said semiconductor material.

10. In an MHD device having a duct for conveying an electrically conductive gas at a temperature of at least about 2000° F. through a magnetic field, electrode means defining at least one wall of said duct comprising:

(a) metallic members forming part of said one wall of said duct and disposed normal to the direction of flow of said gas, said members having an end portion proximate said gas, said end portion having a first end surface and a second end surface spaced further from said gas than said first end surface, the dimension of said end portions in the direction of gas flow being small compared to the dimension of said end portions normal to said direction of gas flow;

(b) means for cooling each said member;

(c) means for electrically insulating adjacent members one from another;

(d) a semiconductor material electrically conductive at the operating temperature of said gas and substantially electrically nonconductive at a temperature substantially less than that of said gas, said material being in contact with and covering each said end surface, said material over said first end surface having first dimensions whereby the heat transfer through said material to said first surface maintains said material over said first surface at a temperature at which it is substantially electrically nonconductive, said material over said second end surface having second dimensions whereby the heat transfer through said material to said second end surface maintains at least a part of said material over said second end surface at a temperature at which it is electrically conductive; and (e) metallic conductor means having an electrical conductivity greater than that of said electrically conductive portion of said semiconductor material at least partially imbedded in said semiconductor material over each said second surface, a portion of said imbedded conductor means being in electrical contact with said electrically conductive portions of said semiconductor material, said imbedded conductor means having a predetermined orientation with respect to said second surface.

11. In an MHD device having a duct for conveying an electrically conductive gas at a temperature of at least about 2000° F. through a magnetic field, electrode means defining at least one wall of said duct comprising:

(a) metallic members forming part of said one wall of said duct and disposed normal to the direction of flow of said gas, said members having an end portion proximate said gas, said end portion having a first end surface and a second end surface spaced further from said gas than said first end surface, the dimension of said end portions in the direction of gas flow being small compared to the dimension of said end portions normal to said direction of gas flow;

(b) means for cooling each said member;

(c) means for electrically insulating adjacent members one from another;

(d) a semiconductor material electrically conductive at the operating temperature of said gas and substantially electrically nonconductive at a temperature substantially less than that of said gas, said material being in contact with and covering each said end surface, said material over said first end surface having first dimensions whereby the heat transfer through said material to said first surface maintains said material over said first surface at a temperature at which it is substantially electrically nonconductive, said material over said second end surface having second dimensions whereby the heat transfer through said material to said second end surface maintains at least a part of said material over said second end surface at a temperature at which it is electrically conductive; and (e) at least one elongated metallic conductor having an electrical conductivity greater than that of said electrically conductive portion of said semiconductor material at least partially imbedded in said semiconductor material over each said second surface, a portion of said imbedded conductor being in electrical contact with said electrically conductive portions of said semiconductor material, the maximum dimension of said conductor being disposed normal to said direction of gas flow, said conductor having a predetermined orientation with rsepect to said second surface.

12. The combination as defined in claim 11 wherein said conductor is surrounded by said semiconductor material.

13. The combination as defined in claim 11 wherein said conductors are not in electrical contact with said members.

14. The combination as defined in claim 11 wherein said conductors are in electrical contact with said members.

15. The combination as defined in claim 14 wherein said electrical contact between said conductors and said members does not substantially change the thermal patterns which would exist in said electrically conductive portions of said semiconductive material if said electrical contacts did not exist.

References Cited
UNITED STATES PATENTS

| | | | |
|---|---|---|---|
| 3,178,596 | 4/1965 | Brogan | 310—11 |
| 3,275,860 | 9/1966 | Way | 310—11 |
| 3,309,546 | 3/1967 | Boll | 310—11 |

MILTON O. HIRSHFIELD, *Primary Examiner.*

D. X. SLINEY, *Assistant Examiner.*